R. E. WOODSON.
NUT CRACKING MACHINE.
APPLICATION FILED MAR. 7, 1914.
1,125,427.
Patented Jan. 19, 1915.
3 SHEETS—SHEET 1.
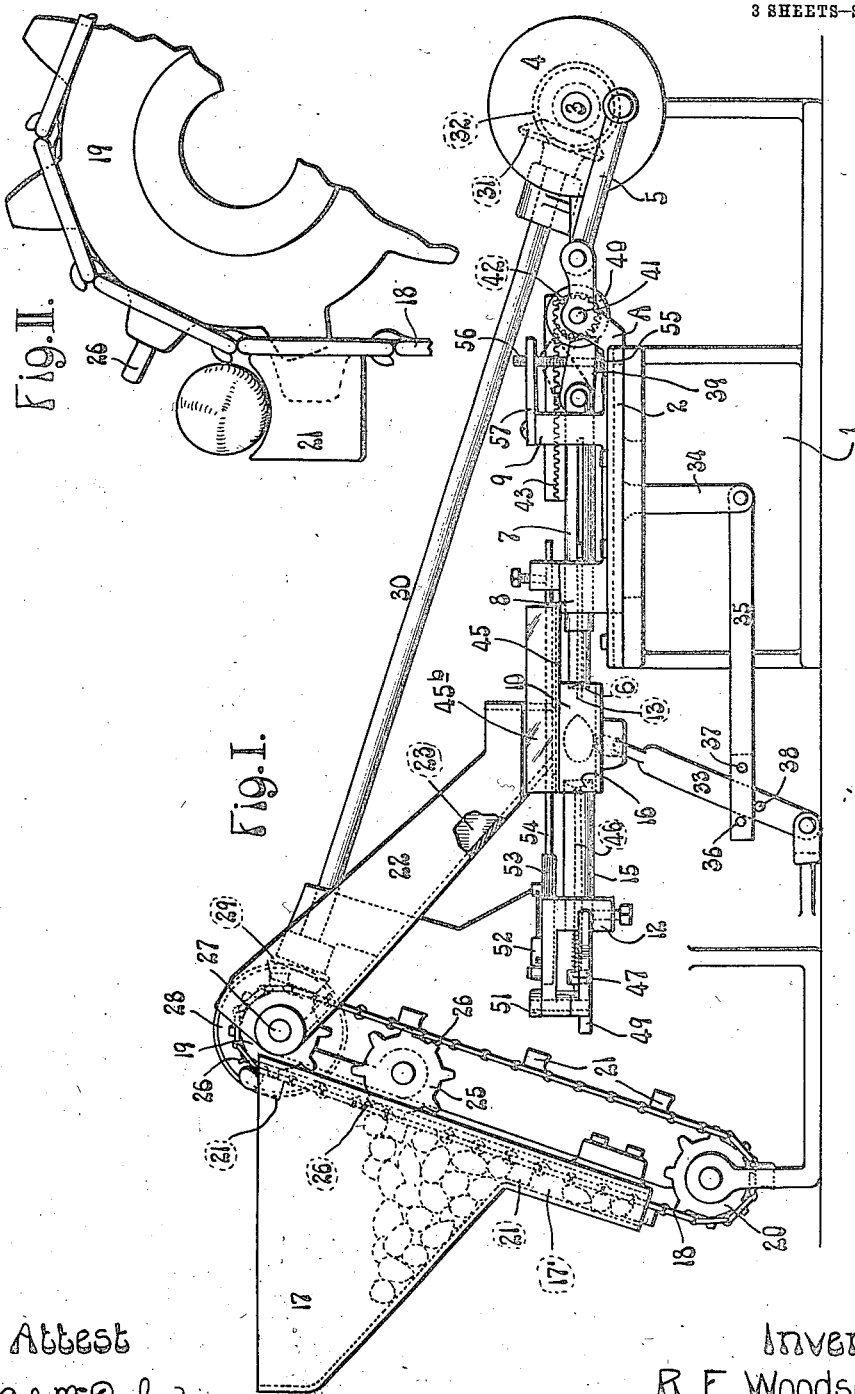
Attest
A. J. McCauley
E. B. Prince
Inventor:
R. E. Woodson
by
Att'ys.

R. E. WOODSON.
NUT CRACKING MACHINE.
APPLICATION FILED MAR. 7, 1914.
1,125,427.
Patented Jan. 19, 1915.
3 SHEETS—SHEET 2.
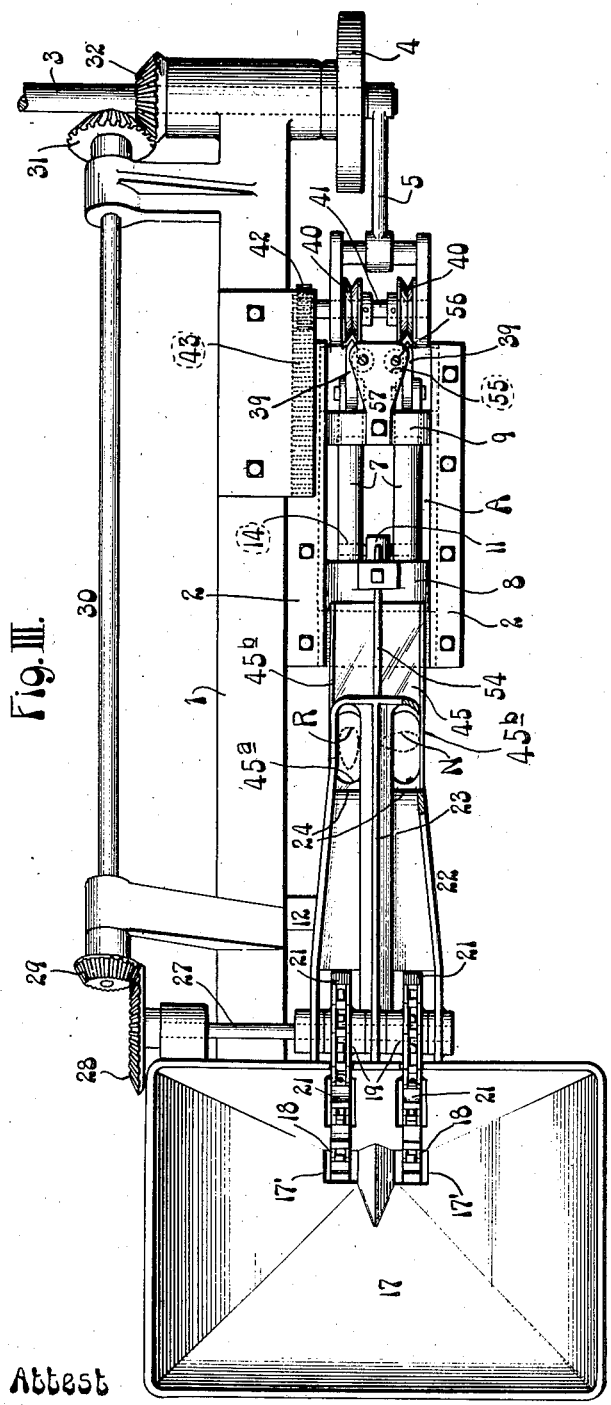
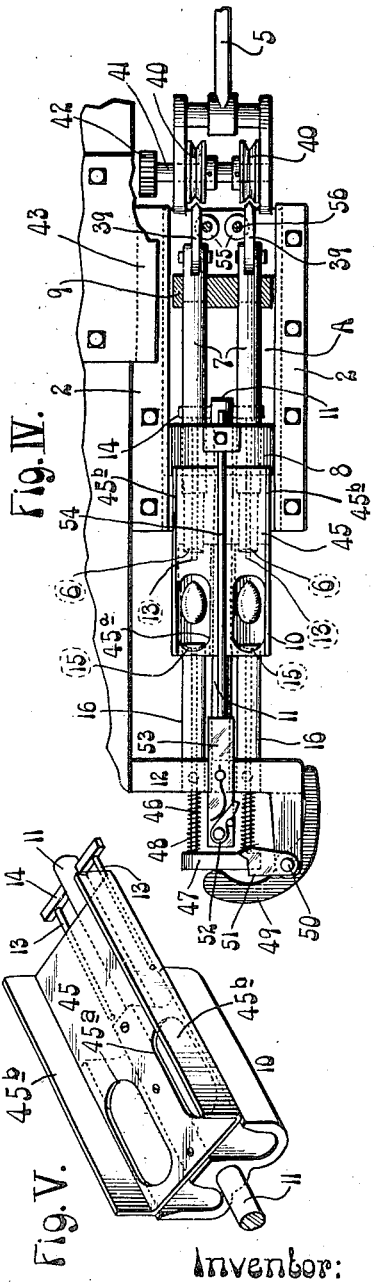
Attest
a. J. M?Cauley
E. B. Quinn
Inventor:
R. E. Woodson
by Knight & Cook Att'ys R. E. WOODSON.
NUT CRACKING MACHINE.
APPLICATION FILED MAR. 7, 1914.
1,125,427.
Patented Jan. 19, 1915.
3 SHEETS—SHEET 3.
Fig. VI.
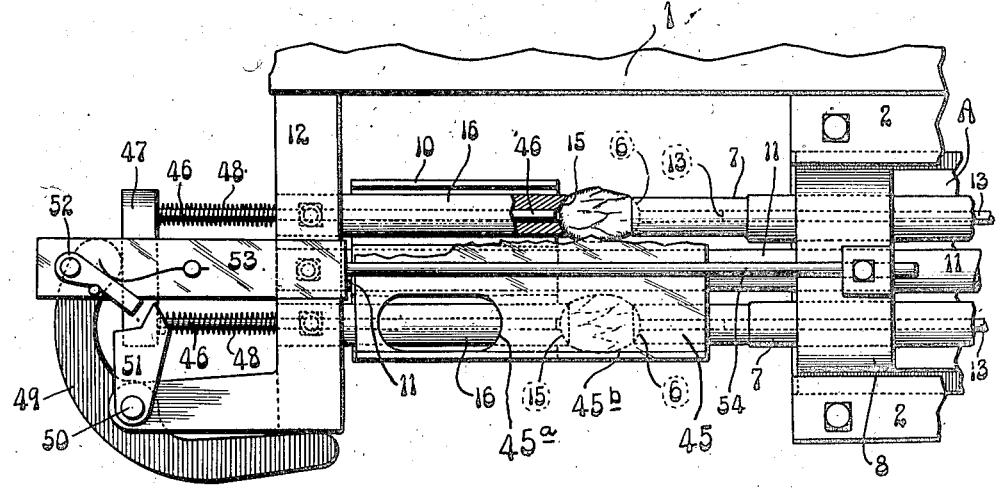
Fig. VII.
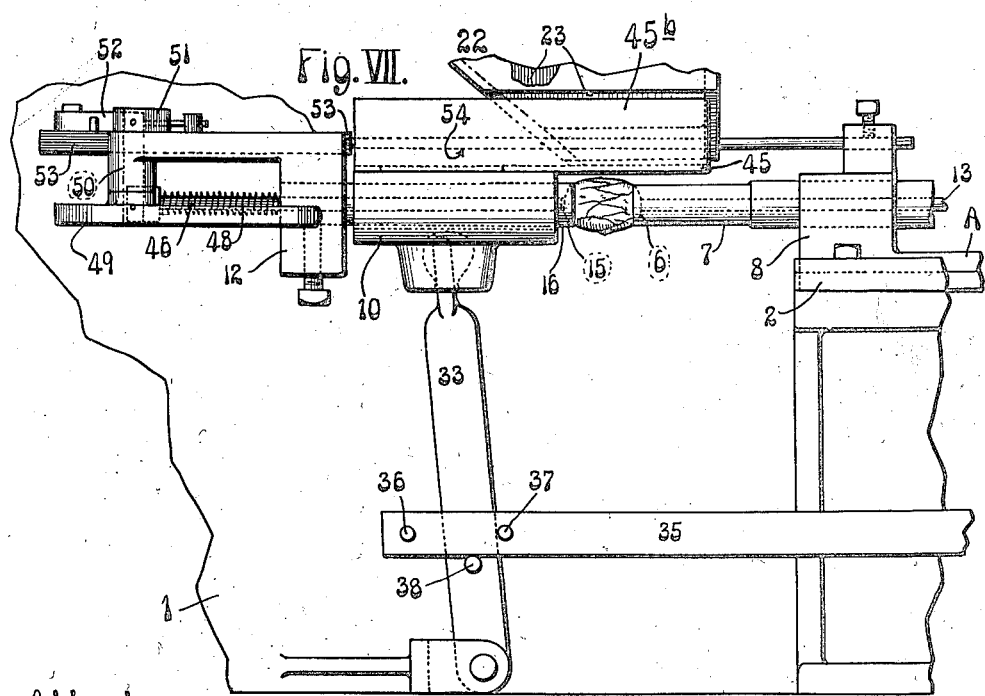
Attest
a. J. McCauley
E. B. Pierce
Inventor:
R. E. Woodson
by Knight & Cook Att'ys.

UNITED STATES PATENT OFFICE.

ROBERT E. WOODSON, OF ST. LOUIS, MISSOURI.

NUT-CRACKING MACHINE.

1,125,427.  Specification of Letters Patent.  Patented Jan. 19, 1915.

Application filed March 7, 1914. Serial No. 823,074.

*To all whom it may concern:*

Be it known that I, ROBERT E. WOODSON, a citizen of the United States of America, and a resident of the city of St. Louis and State of Missouri, have invented certain new and useful Improvements in Nut-Cracking Machines, of which the following is a full, clear, and exact description, reference being had to the accompanying drawings, forming a part of this specification.

My invention relates to a nut cracking machine including jaws between which the nuts are cracked.

One of the objects of the invention is to provide a nut carrier combined with means for discharging nuts therefrom so that the nuts are delivered, one at a time, to cracking jaws, the object being to prevent the accidental delivery of two or more nuts to the jaws.

Another object of the invention is to provide a shuttle by which the nuts are loosely supported and moved into engagement with a cracking jaw, the loosely supported nut being free to adjust itself to its proper position against the cracking jaw.

The invention also includes certain details of construction which will be hereinafter described and pointed out in the claims.

Figure I is a side elevation of my nut cracking machine. Fig. II is an enlarged detail view of one of the nut carriers, showing a nut holder and an ejector projecting over the nut on said holder. Fig. III is a top or plan view of the machine. Fig. IV is a fragmentary top or plan view, partly in section. Fig. V is a perspective view of the shuttle, showing the fixed guide rod upon which the shuttle reciprocates and the ejector rods secured to said fixed guide rod. Fig. VI is an enlarged top or plan view showing certain parts in the positions occupied at the completion of the cracking operation. Fig. VII is a side elevation of the parts shown in Fig. VI.

In the accompanying drawings: 1 designates a support provided with guides 2, in which a carriage A reciprocates. A power shaft 3 mounted in said support is provided with a crank disk 4 connected to the reciprocating carriage A by a pitman 5. Cracking jaws 6 are formed at the ends of plunger rods 7, the latter being slidably fitted to bearing lugs 8 and 9 on the carriage A. A shuttle 10 is slidably mounted on a rod 11 rigidly secured to a lug 12 on the support 1.

The rigid rod 11 extends through the bearing lug 8 on the carriage A, and fixed ejector rods 13 are secured to a cross bar 14 at the forward end of the rigid rod 11. The cross bar 14 extends into slots in the plunger rods 7, and the fixed or stationary ejector rods 13 are arranged in the plunger rods, for the purpose of dislodging fragments of nuts from the cracking jaws 6.

15 designates fixed cracking jaws formed on rods 16 opposing the cracking jaws 6. The rods 16 are adjustably secured to the supporting lug 12 by means of set screws. The nuts to be cracked are introduced into a hopper 17 having a pair of passageways 17' at its lower end, through which nut carriers 18 operate. Each nut carrier is preferably in the form of a sprocket chain passing around a drive wheel 19 and an idle wheel 20. Each nut carrier includes nut holders secured to the sprocket chains and adapted to traverse the passageways 17' of the hopper 17 to pick up the nuts and deliver them from the hopper to a chute 22, leading from the upper end of the hopper to the point at which the nuts are cracked. In the machine I have shown there are two nut carriers and two sets of cracking devices. The chute 22 is, therefore, divided into two passageways by a middle rib 23, and two discharge openings 24 are formed at the lower end of the chute, (Fig. III).

To prevent each of the nut holders 21 from delivering more than one nut at a time, I arrange ejector wheels 25 in the path of movement of the carriers, below the drive wheels 19, and provide throw-off pins 26 on certain teeth of said wheels. The drive wheels 19 may also be provided with throw-off pins 26. The ejector wheels 25 are driven by the sprocket chains 18, and the pins 26 project through the sprocket chains at points above the nut holders, so as to return to the hopper all nuts excepting those which lie directly upon the nut holders. Each nut holder, therefore, carries only one nut, and delivers said nut into the chute 22 as the nut holder passes over the corresponding drive wheel 19. The sprocket chains 18 are driven by a drive shaft 27, to which the drive wheels 19 are fixed, and which is provided with a bevel gear 28 meshing with a pinion 29 fixed to a shaft 30. A bevel gear 31, secured to the lower end of shaft 30 meshes with a bevel gear 32 on the power shaft 3.

The means for reciprocating the shuttle 10 comprises a lever arm 33, pivotally supported at its lower end and extending at its upper end into the shuttle. A leg 34, depending from the reciprocating carriage A, is loosely connected to the lever arm 33 by a link 35, having pins 36 and 37, adapted to engage opposite sides of said lever arm 33. The link arm 35 preferably rests on a pin 38 carried by the lever arm.

39 designates thrust members pivoted to the plunger rod 7, and having free ends adapted to engage drive wheels 40, the latter being fixed to a rotatable shaft 41 carried by the carriage A.

42 designates a pinion meshing with a rack bar 43 fixed to the supporting frame 1. During the operation of the carriage A, the pinion 42 is rotated, due to its engagement with the fixed rack bar 43, and the drive wheels 40 are thus driven to impart a slight movement to the thrust members 39, as will be presently described.

In the operation of my machine, the nuts contained in the hopper 17 are picked up by the nut carriers 18 and delivered to the chute 22, through which they descend to the discharge openings 24, automatically adjusting themselves longitudinally of the chute during their descent. At this time the discharge openings 24 are closed by a closure plate 45 carried by the shuttle 10. During the forward movement of the shuttle, the closure plate 45 moves beyond the chute discharge openings 24, and the nuts then drop through inlet openings 45ª in the closure plate 45, falling into the shuttle where they will lie longitudinally of the shuttle pockets, (see Figs. I and IV). During the rearward movement of the carriage, the shuttle, and the plunger rods 7, carried by the carriage, move toward the rigid cracking jaws 16. The nuts are carried into engagement with the cracking jaws 16, and the shuttle and carriage continue to move rearwardly, thereby retaining the loosely supported nuts in engagement with the said cracking jaws, and permitting the ends of the nuts to become properly seated therein. The cracking jaws 6, on the plunger rods 7, engage the nuts, and a continued movement of the carriage A forces the rotating drive wheels 40 into engagement with the free ends of the thrust members 39.

It should be here stated that the thrust members 39 have a double function, serving as means to imparting movement to the plunger rods 7 during nut cracking action with a final quick impulse movement in cracking the nuts, and the thrust members being so mounted that they are thrown out of action immediately following the cracking of the nuts, with the result of preventing mashing of the nuts between the jaws. To facilitate the nut cracking action I make the thrust members of a form illustrated in Fig. I, so that there is provision for accelerated movement of the plunger rods 7 during the operation of the drive wheels 40 following the engagement of these drive wheels with the thrust members. The free end of each thrust member which receives engagement of the corresponding drive wheels is eccentric with the axis of the thrust member, or in other words, the distance between the bottom of the free end of the thrust member and the axis of said member is greater than the distance between the top of said free end and the axis of the thrust member. Consequently, when the thrust member is engaged by the drive wheel corresponding thereto, as seen in Fig. I, there is provision for a forward thrust by the drive wheel against the thrust member, the force being communicated to the plunger rod to advance the jaw 6 toward the jaw 16. Now as the drive wheel rotates it acts to impart an upward movement to the thrust member 39 with the result of carrying the longer portion of the thrust member toward and to a line drawn longitudinally through the plunger 7 and the axis of the drive wheel, whereby a quick impulse imparted to the plunger rod 7, causing a quick pressure against the nut that breaks or cracks it more effectually than a slow pressure would. Immediately after the cracking action the thrust member is thrown upwardly out of engagement of the drive wheel and the nut cracking action is discontinued at the proper time to obviate mashing of the nut. When the nuts are cracked the shuttle and cracking jaws 7 occupy the position seen in Fig. VI and Fig. VII, and the said parts then begin to move forwardly, permitting the cracked nuts to drop from the cracking jaws.

The nuts are positively ejected from the rigid or stationary cracking jaws by movable ejector rods 46, arranged in the rigid rods 16 and connected at their rear ends by a cross bar 47. Springs 48 force the cross bar 47 into engagement with one end of a bell crank lever 49, the opposite end of said bell crank lever being engaged with the supporting lug 12. A pivot rod 50, fixed to the bell crank lever, is provided with a trip arm 51, operable by a spring pressed tripping pawl 52 carried by a slide bar 53, the latter being connected to the carriage by a long rod 54. When the carriage moves forwardly, after the cracking operation, the tripping pawl 52 engages and imparts movement to the trip arm 51, so as to move the bell crank lever 49. This action causes the cross bar 47 and ejector rods 46 to move forwardly to eject the nuts from the cracking jaws 15, and the tripping pawl 52 finally passes beyond the trip arm 52, permitting the springs 48 to restore the ejector rods 46.

The thrust members 39, pivoted to the front ends of the plunger rods 7, move downwardly during the return movement of the carriage, and are arrested by abutment collars 55 formed at the lower ends of screws 56. These screws are adjustable in a plate 57 on the carriage A. By adjusting the screws 56, the starting position of the thrust members 39 may be varied to obtain the desired cracking movement; and, to facilitate such adjustment, the upper ends of the screws are preferably notched to receive a screw driver.

It will be noted that the closure plate 45, carried by the shuttle 10, is provided with upturned flanges 45$^b$ which extend above the lower end of the chute 22 to form the side walls of a pair of nut holders at the lower end of the chute. Each of the nut holders referred to consists of a movable bottom wall formed by the closure plate 45, a fixed side wall formed by the central rib 23 of the chute (Fig. III), and a movable side wall 45$^b$ opposing said fixed wall. The nuts delivered to the chute drop onto the bottom wall or closure plate 45 where they lie directly between the fixed wall 23 and the movable walls 45$^b$ and it will be presently understood that this manner of holding the nuts forms an important part of my invention. The nuts, after reaching the lower end of the chute, may occupy the position shown at N in Fig. III, in which event the nuts would be held by the opposing side walls of the nut holder instead of being held by the closure plate 45, and if these opposing walls were fixed with respect to each other the nut held thereby would not drop into the shuttle and the succeeding nuts would collect in the chute instead of passing to the nut cracking devices. To overcome this I provide a nut holder having the fixed side wall 23 and the movable side walls 45$^b$, and when a nut is caught between said walls as shown at N, Fig. III, it is released and shifted to the position seen at R (Fig. III) when the movable wall 45$^b$ moves independently of the fixed wall 23.

I claim:—

1. In a nut cracking machine, a jaw, a reciprocating carriage, a plunger movably fitted to said carriage and provided with a jaw opposing said first mentioned jaw, a thrust member pivoted to said plunger, a rotatable drive wheel carried by said carriage and adapted to engage the free end of said thrust member, a rotatable gear wheel carried by said carriage adapted to actuate said drive wheel, and a stationary rack bar meshing with said gear wheel.

2. In a nut cracking machine, a jaw, a plunger provided with a jaw opposing said first named jaw, means for moving said plunger toward said first named jaw, said means including a vertically movable thrust member pivoted to said plunger, and a rotatable drive member for actuating said thrust member; and an adjustable stop for varying the stroke of said thrust member, offset laterally from said thrust member and the said adjustable stop comprising a screw provided with an abutment on which said thrust member normally rests.

3. In a nut cracking machine, jaws, a carriage for moving one of said jaws toward the other jaw, an ejector rod movable through the last named jaw, a tripable member for operating said ejector rod, a tripping device including a pawl for moving said tripable member, and means for securing said tripping device to said carriage.

4. In a nut cracking machine, jaws, one of which is movable toward the other, an ejector rod movable through one of said jaws, a tripable member operable to move said ejector rod, a yieldable tripping device for operating said tripable member, means for operating said yieldable tripping device, and a spring for restoring said ejector rod.

5. In a nut cracking machine, nut cracking devices, a receptacle for the nuts to be cracked, and means for conducting nuts from said receptacle to said nut cracking devices; said means including a carrier provided with a nut holder, an ejector movable over the nut on said holder to prevent the delivery of more than one nut by said nut holder, and means for operating said ejector in unison with said carrier.

6. In a nut cracking machine, nut cracking devices, a receptacle for the nuts to be cracked, and means for conducting nuts from said receptacle to said nut cracking devices; said means including a carrier provided with a nut holder, an ejector wheel provided with ejector pins movable over the nut on said holder to prevent the delivery of more than one nut by said nut holder, and means for operating said ejector in unison with said carrier.

7. In a nut cracking machine, a pair of jaws, a carriage for moving one of said jaws toward the other jaw, a shuttle for supporting a nut between said jaws, a shuttle drive member, and a link loosely connecting said shuttle drive member to said carriage.

8. In a nut cracking machine, nut cracking devices, a holder for the nuts to be delivered to said nut cracking devices, a chute leading to said holder, the latter being located between said chute and the nut cracking devices, said holder being provided with a fixed side wall and a movable side wall opposing said fixed side wall, the nuts to be cracked being positioned between said side walls, and means for moving said movable side wall to release the nuts from said opposite side walls.

9. In a nut cracking machine, nut cracking devices, a holder for the nuts to be delivered to said nut cracking devices, said holder being provided with a fixed side wall and a movable side wall opposing said fixed side wall, the nuts to be cracked being positioned between said side walls, and means for moving said movable side wall to release the nuts from said opposing walls.

10. In a nut cracking machine, nut cracking devices, a holder for the nuts to be delivered to said nut cracking devices, said holder being provided with a movable bottom wall, a fixed side wall and a movable side wall opposing said fixed side wall, the nuts to be cracked being positioned between said opposing walls, and means for moving said movable walls to release the nuts from said opposing walls.

11. In a nut cracking machine, a pair of jaws, one of which is movable toward the other, a thrust member pivotally connected to one of said jaws, and a rotatable member for moving said thrust member longitudinally and rotatably; said thrust member being so shaped as to provide for accelerated movement of said movable jaw during pivotal movement of said thrust member.

ROBT. E. WOODSON.

In the presence of—
  E. K. CLARK,
  A. J. McCAULEY.